Nov. 25, 1952       F. C. ISELY       2,619,634
APPARATUS FOR MEASURING PULSE POWER AND
FOR TESTING RADIO ECHO APPARATUS
Filed Feb. 23, 1943
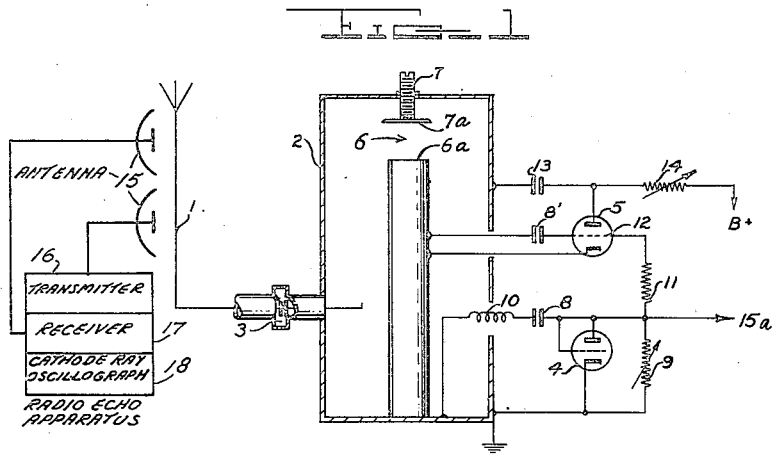
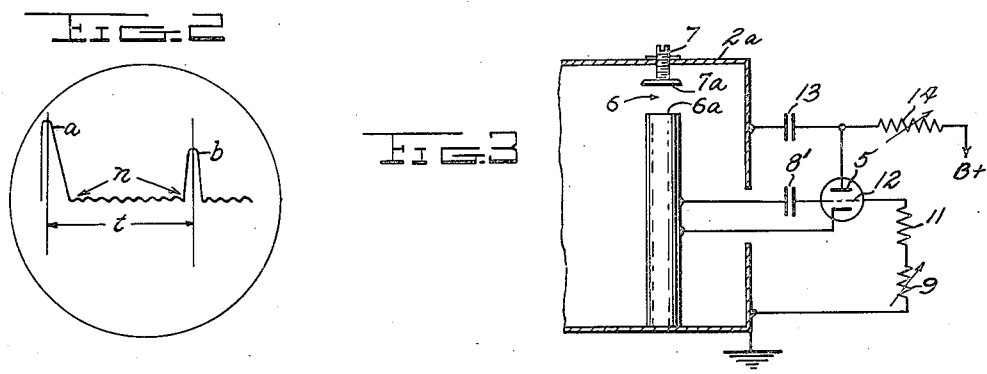
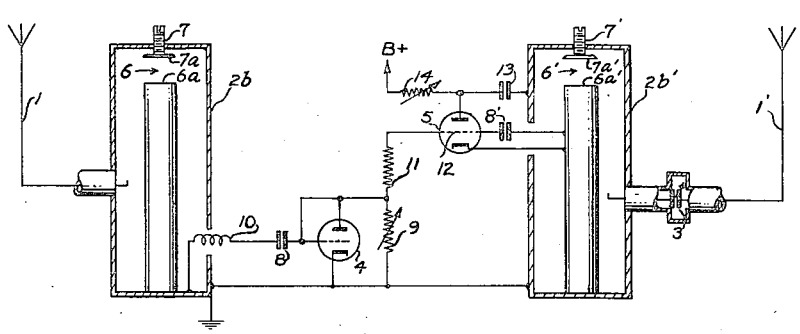
Inventor
FRANK C. ISELY Patented Nov. 25, 1952

2,619,634

UNITED STATES PATENT OFFICE 2,619,634

APPARATUS FOR MEASURING PULSE POWER AND FOR TESTING RADIO ECHO APPARATUS

Frank C. Isely, Washington, D. C.

Application February 23, 1943, Serial No. 476,856

11 Claims. (Cl. 343—13)

(Granted under the act of March 3, 1883, as amended April 30, 1928; 370 O. G. 757)

This invention relates to methods of and means for testing radio echo apparatus.

Radio echo apparatus provided by the prior art includes a means for producing and transmitting a series of equally spaced energy pulses, a means for receiving energy pulses reflected from remote objects being impinged upon by said transmitted series, such as a cathode ray oscillograph, a cathode ray tube and means for producing a time sweep of the electron beam thereof, and a means responsive to reception of reflectd energy for producing time indications on the oscillograph indicative of the range of the object from which the energy is reflected. Oviously an operator of such equipment normally desires to obtain from time to time an accurate account of the operating characteristics of the apparatus. When such equipment is employed on board ships or aircraft acting in a group, one of the accompanying ships or aircraft can be selected as a suitable target in order to obtain the necessary information. When acting singly, however, there is normally no such expedient target present.

It is therefore an object of this invention to provide an artificial target for testing radio echo equipment.

Another object of this invention is to provide a novel method of and means for facilitating circuit alignment in radio echo apparatus.

Another object of this invention is to provide a novel method of and means for indicating relative receiver sensitivity of a radio echo apparatus.

Another object of this invention is to provide a novel method of and means for indicating relative transmitter and receiver frequency alignment in a radio echo apparatus.

Another object of this invention is to provide a novel method of and means for indicating relative transmitter power in radio echo apparatus.

Other objects and features of the present invention will become apparent upon a careful consideration of the following detailed description when taken together with the accompanying drawing. The various figures of the drawing are for the express purpose of illustration only and not as a definition of the limits of the invention, reference for the latter purpose being had to the appended claims.

Fig. 1 is a schematic diagram partly in cross-section of a preferred embodiment of the invention illustrated with a radio echo apparatus;

Fig. 2 is a typical view of an indication appearing on the viewing screen of an oscillograph used in radio echo apparatus and produced by the apparatus shown in Fig. 1;

Fig. 3 is a schematic diagram partly in cross-section of another embodiment of the present invention, and Fig. 4 is a schematic diagram partly in cross-section of a modification of the preferred embodiment shown in Fig. 1.

Reference is had, more particularly, to Fig. 1 wherein there is shown my novel apparatus for testing radio echo equipment, such as a radio echo apparatus including antenna 15, transmitter 16, receiver 17 and cathode ray oscillograph 18, which includes the antenna and transmission line 1, one-quarter wave concentric resonator 2, attenuator 3, tube 4 and oscillator tube 5. Quarter-wave resonator 2 would normally be of cumbersome length and impracticable for small compact enclosures; therefore, capacitor 6, tuned by set screw 7, is provided therein in order to reduce the overall length thereof and thereby to allow the apparatus to be enclosed in a small compact cabinet. The capacitor 6 comprises disc 7a carried by the screw 7 in capacitive relation with the upper end surface 6a of the resonator inner conductor.

When it is desired to test radio echo equipment with the present apparatus, antenna 1 is located adjacent the radio echo apparatus antenna 15. Thus substantially simultaneously with the transmission of an energy pulse from the radio echo apparatus antenna 15, shown in Fig. 2 as indication a on the oscillograph 18, an energy pulse passes down transmission line 1 to excite the resonator 2. During the period of the transmitted pulse a voltage is induced in inductance 19 which causes tube 4 to draw a rectified grid current and thereby charge condenser 8 negatively. The charge on condenser 8 produces a sufficiently negative bias on grid 12 to quench the oscillator tube 5. The charge on the condenser 8 subsequently leaks off through resistance 9 to render the tube 5 operable. The tube 5 will then oscillate during the discharge of condenser 13 through it, after which it will again be rendered quiescent by the reduced anode voltage for the period required to charge condenser 13 through resistance 14. It therefore becomes obvious that the first period of quiescence of the tube 5, i. e. the interim between the radio echo pulse and the period of oscillation, is a function of the time constant circuit comprising condenser 8 and resistance 9, while the second period of quiescence of the tube 5, i. e. the interim ensuing the oscillation period is a function of the time constant circuit comprising resistance 14 and condenser 13. Normally, the above mentioned time constant circuits are adjusted so as to permit one period of oscillation of tube 5 between each transmitted radio pulse from the radio echo apparatus. As tube 5 oscillates, resonator 2 is energized and an energy pulse is radiated from the antenna 1 which is absorbed by the radio echo antenna 15, suitably amplified by the radio echo receiver 13 and impressed upon the oscillograph 18 to form indication $b$ as shown in Fig. 2.

Obviously, as illustrated by the embodiment of the invention shown in Fig. 3 of the drawings, the tube 5 can be employed separately as a self-quenching oscillator, by deleting tube 4 and its associated circuit elements and grounding grid 12 through resistances 9 and 11. With this arrangement the transmitted pulse $a$ causes condenser 8' to charge sufficiently negative to render the tube 5 quiescent for a period of time proportional to the transmitter power and time constant comprising capacitance 8' and resistances 9 and 11. Thus upon the depletion of the negative charge on condenser 8' the oscillator tube 5 pulses to produce the indication $b$ in the same manner as heretofore set forth.

Reference is had, more particularly, to Fig. 2 wherein there is shown the face of the oscillograph 18 of the radio echo apparatus with an indication $a$ of the transmitted pulse and the indication $b$ of the energy pulse radiated from the antenna 1 separated in time by an interval $t$. As mentioned previously the interval $t$ is a function of the time constant circuit comprising condenser 8 and resistance 9. This interval, however, is also a function of the transmitter power since the charge on the condenser 8 is proportional to the amount of energy energizing the resonator 2 by way of the antenna 1 and subsequently stored in the inductance 10. Thus any deviation in the interval $t$ from a value set by resistance 9 can be interpreted as a measure of relative transmitter power.

When it is desired to examine the sensitivity of the radio echo receiver 17, the attenuator 3 is adjusted to lower the amplitude of the energy pulse radiated from the antenna 1 in order that the recovery time of the receiver will be short and to reduce the height of the indication $b$ to a comparable value with the noise level indication $n$. The necessary information is thereby provided so that the receiver may be adjusted for optimum sensitivity.

To determine the transmitter frequency, the capacitor 6 is adjusted by the set screw 7 so that the resonator 2 is tuned to absolute resonance with the frequency of the transmitter 16. The adjustment of absolute resonance may be determined by conventional indicators such as an "electric tuning eye," not shown, which may be connected to the line 15a. This measurement will enable the operator to determine whether there has been a serious drift in transmitter frequency which might be detrimental to the efficiency of the radio echo apparatus. It will also provide him with the necessary information to align the transmitter and receiver.

The modifications of the present invention shown in Fig. 4 of the drawings is designed for operation with radio echo apparatus having different transmitter and receiver frequencies. A pair of concentric resonators 2b and 2b' are provided. The concentric resonator 2b is tuned to the frequency of the radio echo apparatus transmitter, while the resonator 2b' is tuned to the receiver frequency of the radio echo apparatus. Antenna 1' is coupled to the resonator 2b' through attenuator means 3'. In this modification, the oscillator 5 is coupled to the resonator 2b', while the means for controlling operation of the oscillator 5 in accordance with pulses transmitted by the radio echo apparatus, namely the inductance 10, the condenser 8, tube 4 and the resistor 9, are coupled to the resonator 2b. Operation of this modification is identical to that shown in Fig. 1 with the exception that the produced pulses radiated from the antenna 1', are at a frequency different from the frequency to which the apparatus is responsive.

Although several embodiments of the present invention have been disclosed and described herein it is to be expressly understood that various changes and substitutions may be made therein without departing from the spirit of the invention as well understood by those skilled in the art. Reference therefor will be had to the appended claims for a definition of the limits of the invention.

The invention described herein may be manufactured and used by or for the Government of the United States of America for governmental purposes without the payment of any royalties thereon or therefor.

I claim:
1. A device for testing radio echo apparatus of the type operable to transmit pulses and to receive echoes produced by objects reflecting said pulses, comprising an oscillator tuned to the frequency of said apparatus, oscillator control means including means blocking the oscillator responsively to pulses transmitted by said apparatus and means momentarily unblocking said oscillator a time interval after each of said transmitted pulses proportional to the power thereof, and radiating means fed by the pulses generated by said oscillator.

2. A device for testing radio echo apparatus of the type operable to transmit pulses and to receive said pulses and echoes produced by objects reflecting said pulses, comprising an oscillator tuned to the receiving frequency of said apparatus, pulse power responsive means fed by the pulses transmitted by the apparatus to produce control voltage proportional to the power of the transmitted pulses, oscillator control means including means blocking said oscillator responsive to pulses transmitted by said apparatus and means responsive to said control voltages momentarily unblocking said oscillator a time interval after each of said transmitted pulses proportional to the power thereof, and radiating means fed by the pulses generated by said oscillator.

3. A device for testing radio echo apparatus of the type operable to transmit pulses, to receive said pulses and echoes produced by objects reflecting said pulses and to produce a time indication of said pulses and said echoes thereof, comprising an oscillator tuned to the frequency of reception of said apparatus, pulse power measuring means responsive to pulses transmitted by said apparatus producing control signals characterized in accordance with the power of the transmitted pulses, oscillator control means including means blocking said oscillator responsive to pulses transmitted by said apparaus and means responsive to said control signals momentarily unblocking said oscillator a time interval after each of said transmitted pulses in accordance with the power thereof, and means radiating pulses produced by said oscillator for reception by said apparatus so that an indication of said interval is provided on said apparatus by employing indications produced by said transmitted pulses and by the pulses produced by said oscillator.

4. An apparatus for testing radio echo apparatus having a transmitter operable for producing energy pulses and a receiver, comprising a resonator tuned to the frequency of the apparatus, an antenna coupled to said resonator for supplying transmitter pulses thereto, an oscillator tube connected to said resonator, blocking means for said oscillator tube operative in response operation of said transmitter, and unblocking means for said oscillator tube operative to momentarily unblock said oscillator tube and radiate an energy pulse from said antenna at a time interval after operation of said transmitter proportional to the power of transmitted pulses.

5. A device for testing radio echo apparatus having a transmitter operable for producing an energy pulse and a receiver, comprising a resonator tuned to the frequency of said apparatus, an antenna coupled to said resonator for supplying a transmitted pulse thereto, an oscillator tube connected to said resonator, blocking means for said tube operative in response to the transmitted pulse supplied to said resonator unblocking means for said tube operative to momentarily unblock said tube and to radiate an energy pulse from said antenna at a time interval after the supplied transmitted pulse, pulse power measuring means fed by the transmitted pulse, and means for regulating said time interval in accordance with the pulse power measuring means.

6. A device for testing radio echo apparatus having a transmitter operable for producing an energy pulse and a receiver energized by said transmitter pulse and echoes produced by objects reflecting said transmitter pulse, comprising a quarter wave length concentric resonator tuned to the frequency of said apparatus, an antenna coupled to said resonator, an oscillator tube coupled to said resonator, means blocking said oscillator tube in response to the transmitted pulse fed to the resonator by the antenna, means momentarily unblocking said oscillator tube at a time interval after operation of said transmitter to radiate an energy pulse from said antenna for reception by the receiver of said apparatus, and means varying sad time interval in accordance with the power of said transmitted pulse.

7. An apparatus for determining the power of an energy pulse comprising pulse power responsive means fed by the energy pulse to produce a control voltage proportional to the power of the energy pulse, indicator means producing an indication including a pair of spaced pulses, and phasing means controlling said indicator means responsively to the control voltage for varying the spacing between the pair of spaced pulses in accordance with the control voltage.

8. A device for determining the power of a transmitted energy pulse comprising receiving means for said transmitted energy pulse, generator means producing a second energy pulse in response to the transmitted pulse received by said receiving means, pulse power responsive means fed by the transmitted pulse producing a control voltage proportional to the power of the transmitted pulse, and delay means operative responsively to the control voltage for delaying operation of said generator means.

9. A means for testing a radio echo apparatus having a transmitter for producing an energy pulse, comprising an oscillator, blocking means for said oscillator operative responsively to operation of said transmitter and unblocking means for said oscillator operative responsively to the power of the energy pulse to momentarily unblock said oscillator to produce an energy pulse at a time interval after said transmitter pulse in proportion to the power thereof.

10. An apparatus for testing radio echo apparatus including a pulse transmitter and a pulse receiver, comprising a first resonator tuned to the frequency of said transmitter and supplied with pulses produced thereby, oscillator means including a resonator tuned to the frequency of said receiver, means responsive to pulses supplied to said first resonator for blocking said oscillator means and for momentarily unblocking said oscillator means at a time spaced from the time of said transmitted pulses by an interval determined by the power of said transmitted pulses, and means radiating the energy produced by said oscillator means.

11. An apparatus for determining the power of a series of transmitted energy pulses comprising pulse generator means responsive to said transmitted series for producing a corresponding series of energy pulses spaced from the transmitted series pulse power responsive means fed by the transmitted series producing a control voltage proportional to the pulse power thereof, and phasing means regulating the relative spacing between corresponding pulses of said transmitted and produced series responsively to the control voltage.

FRANK C. ISELY.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,171,150 | Shelby | Aug. 29, 1939 |
| 2,323,534 | Goddard | July 6, 1943 |
| 2,333,688 | Shepard | Nov. 9, 1943 |
| 2,392,546 | Peterson | Jan. 8, 1946 |
| 2,400,309 | Kock | May 14, 1946 |
| 2,404,527 | Potapenko | July 23, 1946 |
| 2,419,571 | Labin et al. | Apr. 29, 1947 |
| 2,421,016 | Deloraine et al. | May 27, 1947 |
| 2,422,382 | Winchel | June 17, 1947 |
| 2,425,600 | Coykendall | Aug. 12, 1947 |
| 2,432,180 | Tourshou et al. | Dec. 9, 1947 |